(12) United States Patent  
Vange et al.

(10) Patent No.: US 7,020,783 B2
(45) Date of Patent: Mar. 28, 2006

(54) METHOD AND SYSTEM FOR OVERCOMING DENIAL OF SERVICE ATTACKS

(75) Inventors: Mark Vange, Toronto (CA); Marc Plumb, Toronto (CA); Kevin Blumberg, Toronto (CA)

(73) Assignee: Circadence Corporation, Boulder, CO (US)

( * ) Notice: Subject to any disclaimer, the term of this patent is extended or adjusted under 35 U.S.C. 154(b) by 977 days.

(21) Appl. No.: 09/835,938

(22) Filed: Apr. 16, 2001

(65) Prior Publication Data

US 2002/0002686 A1    Jan. 3, 2002

Related U.S. Application Data

(60) Provisional application No. 60/197,490, filed on Apr. 17, 2000.

(51) Int. Cl.
*H04L 9/00* (2006.01)
(52) U.S. Cl. ........................ 713/201; 713/200
(58) Field of Classification Search ........ 713/200–201; 709/200, 217–221, 223–226, 228–229
See application file for complete search history.

(56) References Cited

U.S. PATENT DOCUMENTS

| 5,258,983 A | 11/1993 | Lane et al. |
| 5,673,322 A | 9/1997 | Pepe et al. |
| 5,757,771 A | 5/1998 | Li et al. |
| 5,933,412 A | 8/1999 | Choudhury et al. |
| 5,951,694 A | 9/1999 | Choquier et al. |
| 5,999,971 A | 12/1999 | Buckland |
| 6,006,264 A | 12/1999 | Colby et al. |
| 6,023,456 A | 2/2000 | Chapman et al. |
| 6,034,964 A | 3/2000 | Fukushima et al. |
| 6,167,449 A | 12/2000 | Arnold et al. |
| 6,529,948 B1* | 3/2003 | Bowman-Amuah ......... 709/217 |

FOREIGN PATENT DOCUMENTS

| EP | 0384339 A2 | 8/1990 |
| EP | 0794491 A2 | 9/1997 |

(Continued)

OTHER PUBLICATIONS

K. Sriram, "Methodologies for bandwidth allocation, transmission scheduling, and congestion avoidance in broadband ATM networks", Computer Networks and ISDN Systems, 26 (1993) pp. 43-59.

(Continued)

*Primary Examiner*—Hosuk Song
(74) *Attorney, Agent, or Firm*—Stuart T. Langley; Hogan & Hartson L.L.P.

(57) ABSTRACT

A system for handling denial of service attacks on behalf of a shared network resource. A request processing component deployed within a network, the request processing component having an interface configured to receive requests on behalf of the shared network resource. A rate control component coupled to the request processing component, the rate control component comprising program and data structures operable to selectively forward received requests to the shared network resource at a rate selected to prevent the shared network resource from crashing or becoming undesirably busy. Preferably, the system includes a denial of service attack detection component coupled to the request processing component and the rate control component and operable to monitor request metrics from the request processing component and provide configuration information to the rate control component.

15 Claims, 6 Drawing Sheets

FOREIGN PATENT DOCUMENTS

| | | |
|---|---|---|
| EP | 0828214 A2 | 3/1998 |
| EP | 0942363 A2 | 9/1999 |
| GB | 2309558 | 7/1997 |
| WO | WO 97/29424 | 8/1997 |
| WO | WO 97/30392 | 8/1997 |
| WO | WO 98/26553 | 6/1998 |
| WO | WO 98/28938 | 7/1998 |
| WO | WO 99/09689 | 2/1999 |
| WO | WO 99/18534 | 4/1999 |
| WO | WO 99/57620 | 11/1999 |
| WO | WO 99/57637 | 11/1999 |

OTHER PUBLICATIONS

V. P. Kumar, et al., "Beyond Best Effort: Router Architectures for the Differentiated Services of Tomorrow's Internet", May 1998, IEEE Communications Magazine, pp. 152-164.

R. M. Adler, "Distributed Coordination Models for Client/Server Computing", Apr. 1995, IEEE Computer, pp. 14-22.

G.-C. Lai, et al., "Support QoS In IP over ATM", Computer Communications, 22 (1999) pp. 411-418.

* cited by examiner

METHOD AND SYSTEM FOR OVERCOMING DENIAL OF SERVICE ATTACKS

RELATED APPLICATIONS

The present invention claims priority from U.S. Provisional Patent Application No. 60/197,490 entitled CONDUCTOR GATEWAY filed on Apr. 17, 2000.

BACKGROUND OF THE INVENTION

1. Field of the Invention

The present invention relates, in general, to network computing systems, and, more particularly, to software, systems and methods for providing services over a network that are resistant to denial of service attacks.

2. Relevant Background

Recently, DoS attacks have been blamed for bringing down several electronic commerce (e-commerce) web sites and government sites. These outages, although temporary, are enormously expensive to businesses such as retailers, business-to-business commerce sites, and securities brokerages, for example, where continuous availability and reliable performance underpin the value of the commerce site. These problems and the lack of solutions for DoS problems discourage existing and potential e-commerce providers from establishing and expanding their electronic commerce offerings.

A denial of service (DoS) attack is a type of security breach to a computer system in which a user or organization is deprived of the services of a resource they would normally expect to have. Typically, the loss of service is due to the inability of a particular network service, such as a web server or e-mail, to be available or the temporary loss of all network connectivity and services. A denial of service attack can also destroy programming and files in a computer system. Although usually thought of as an intentional and malicious act, a denial of service event can sometimes happen accidentally as a result of poor planning or a sudden large increase in volume directed to a network server. DoS attacks can cost the target person or company a great deal of time and money.

In a DoS attack, a large volume of requests are addressed to a particular shared resource such as a web site, database, mail server and the like. In the case of a malicious attack, the requests are generated by a "hacker" or "cracker". The resource has a fixed ability to respond to requests, and, at some point, a large volume of requests will cause delays in servicing genuine requests. The web resource may actually crash in a worst case scenario. Even when a system is robust enough to avoid a crash, genuine requests simply cannot be segregated from the hacker-generated requests thereby slowing access for legitimate users.

A common form of a DoS attack sends more traffic to a network address than the server program or system operating at that network address can handle. Programs and the network interface routines that connect the program to the network use data buffers for a number of tasks. For example, transmission control protocol (TCP) layer software uses buffers to handle handshaking exchanges of messages used to establish a communication session. Each connection request consumes a portion of the finite memory space allotted to these buffers. A large number of connection requests received in a short period of time will consume the allotted memory space making the system unable to respond to legitimate requests and potentially causing the system to crash due to buffer overloads.

Currently, there are few effective ways to protect against denial of service attacks in the Internet. The Internet is designed to forward packets from a sender to a client quickly and robustly. Hence, it is difficult to detect and stop malicious requests once they are launched. Filtering of packets by Internet service providers (ISPs) can be effective to reduce attacks from forged source addresses, but is impractical to handle attacks from legitimate IP addresses. Moreover, ingress filtering requires upgrades to a large number of existing routers which will take many years to accomplish.

In practice, a web site owner or host responds to a DoS attack reactively. Once an attack is detected, packets are analyzed to determine the source address(es) of the attack. Upstream service providers are notified of the address ranges and the upstream network equipment, such as routers, are configured to block packets from the malicious addresses. The entire process can take several hours and sends the service providers, web site owner and web site hosts into upheaval. Moreover, the attack can begin again from another address almost as soon as the original attack is thwarted. DoS attacks are typically launched from a multitude of computers that are hijacked by the assailant. The computers selected for hijacking generally have a large connection to the Internet, enabling them to open a large number of TCP connections to the target. While it is possible to trace the instigator and take legal action, this remedy is difficult and leaves the network vulnerable. Hence, a need exists for systems, methods and software to inhibit and preferably prevent the effectiveness of DoS attacks. As the assailant's computer is rarely directly involved in the DoS attack, it is difficult to trace the origin of the attack, especially in time to be able to curtail the attack.

SUMMARY OF THE INVENTION

Briefly stated, the present invention involves a system for handling denial of service attacks on behalf of a shared network resource. A request processing component deployed within a network, the request processing component having an interface configured to receive requests on behalf of the shared network resource. A rate control component coupled to the request processing component, the rate control component comprising program and data structures operable to selectively forward received requests to the shared network resource at a rate selected to prevent the shared network resource from crashing. Preferably, the system includes a denial of service attack detection component coupled to the request processing component and the rate control component and operable to monitor request metrics from the request processing component and provide configuration information to the rate control component.

DETAILED DESCRIPTION OF THE PREFERRED EMBODIMENTS

The present invention involves systems, methods and software that implement a multistage defense to denial of service (DoS) attacks. While the present invention is generally described in terms of malicious attacks, it is readily applicable to inadvertent attacks and overload conditions caused by multiple legitimate users attempting to access a network resource in a short period of time. In the particular example, a three stage response is contemplated. First, the front-end resources of a network resource are replicated and distributed throughout front-end servers that are topologically dispersed across the network. Second, the distributed front-end servers are monitored by a management component to detect conditions which suggest a DoS attack is underway. Third, the management component can automatically reconfigure the front-end servers to block and/or respond to requests that are creating the DoS condition.

Using the invention, a plurality of front-end servers are deployed to receive requests on behalf of a shared network server. Preferably, the front-end servers are not statically bound to any particular shared network server, but instead are dynamically assigned to particular servers based on traffic volume, network performance, quality of service, or other metrics. Each front-end server can be configured to connect to a particular shared network server to provide content and functionality on behalf of the shared server. To access the shared network server, requests are be processed through one of the front-end servers.

Each front-end has a unique network address. When, for example, one-hundred front-end servers are assigned to a particular shared network resource, the network will route DoS-causing packets to all of the one-hundred addresses rather than to the single network address of the shared network resource. This architecture makes it difficult to even launch a DoS attack as the attacker has no control over how many front-end servers will be involved or the addresses of those front-end servers.

Moreover, the limited input resources of a particular network server are fanned out and multiplied across a network topology. The front-end servers funnel requests to a particular shared network server while regulating the total number of requests that are forwarded to the server. In a denial of service attack, the front-end servers bear the brunt of the attack so that the shared network server resources do not become overwhelmed.

In a preferred implementation, a network redirector initially receives requests destined for the shared server and redirects them to one of the front-end servers based on a real time evaluation of front-end performance. When viewed as a total, the plurality of front-ends offer a greater quantity of access ports and bandwidth than would normally be possible with a single web site or other shared network resource. For example, a network of 100 front-ends would require 100 times the number of requests before the front-ends were overwhelmed. Moreover, the front-end servers may be configured specially to handle a large number of connection requests, in contrast to general-purpose server software and systems. For example, the front-end servers can provide additional buffer space, buffer size, and resources so as to be more robust than a conventional general purpose server when faced with a DoS attack.

In the event of a DoS attack, each request would be routed to one of the front-ends, but the requests are distributed about the available front-ends by the redirector mechanism. Meanwhile, legitimate request would be handled in a similar way by being routed to any of the available front-ends. These legitimate requests can continue to obtain service from the shared network server.

In a preferred implementation, the front-end servers are coupled to a management server that monitors performance metrics. Because the management server has visibility to a large number of front-end servers, a DoS attack can be more readily detected. Filtering techniques that are impractical in an unmanaged network, such as source address verification and blocking, become practical because the management server can dynamically monitor and control all of the ingress paths to a particular shared network resource. Once a source address or range of source addresses associated with an attack are identified, they can be blocked quickly and/or automatically by the front-end servers and redirector mechanism.

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary, the present invention is applicable to significantly larger, more complex network environments as well as small network environments such as conventional LAN systems.

Figure 1:
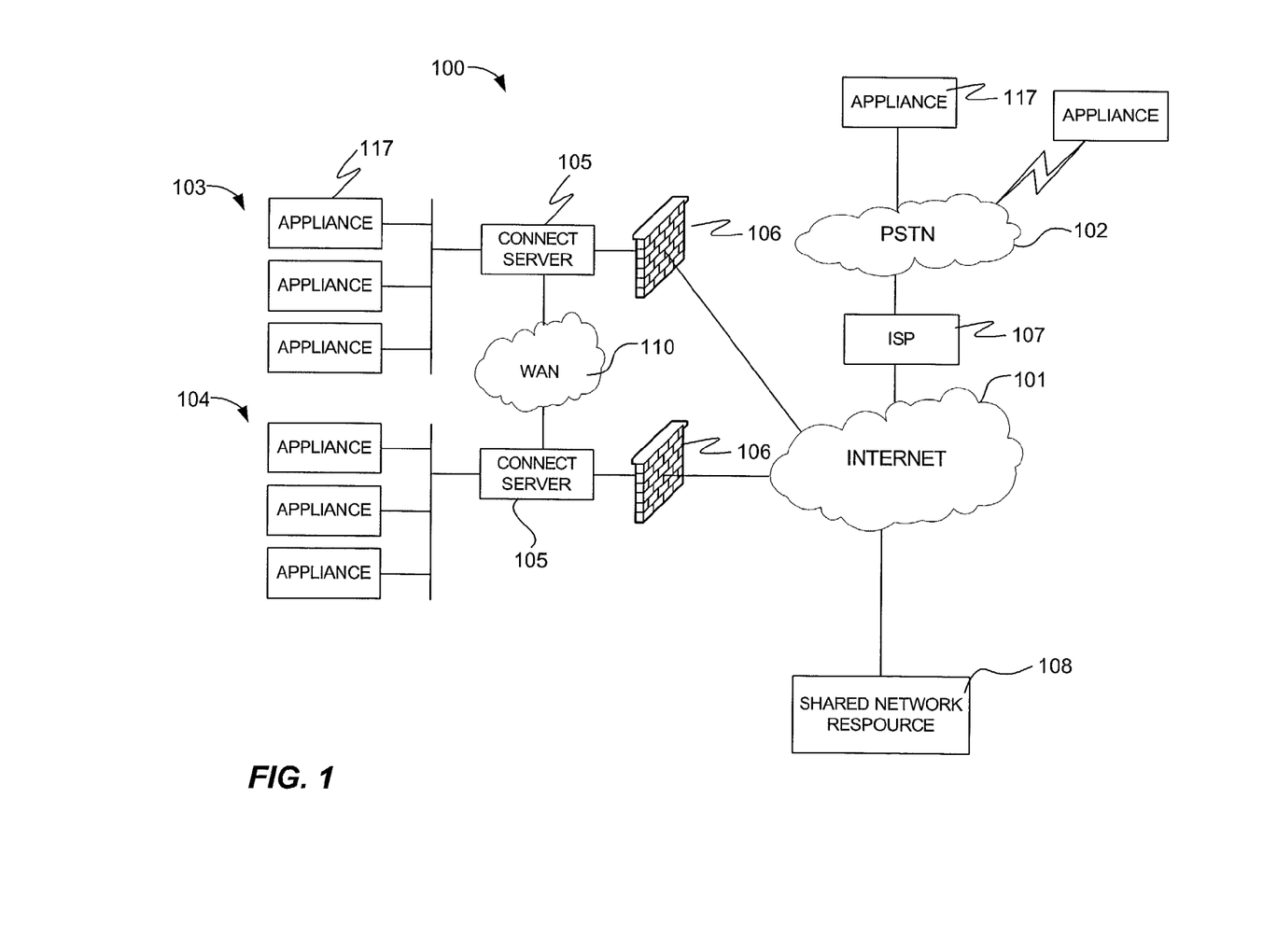
FIG. 1 shows a networked computer environment in which the present invention is implemented.

FIG. 1 shows an exemplary computing environment 100 in which the present invention may be implemented. Environment 100 includes a variety of internetworking components such as Internet 101, public switched telephone network (PSTN) 102, and wide area network (WAN) 110. A first network segment 103 (i.e., local area network or LAN) and a second network segment 104 are interconnected using Internet 101 and/or WAN 110. The distinct internetwork designations shown in FIG. 1 provide a conceptual model and are provided for ease of description and understanding. In practice, Internet 101 may include components of both PSTN 102 and WAN 110. Likewise, WAN 110 is often implemented using PSTN 102 and/or Internet 101.

Essentially, a number of computing devices such as appliances 117 and shared network resource 210 are interconnected through network components 101, 102 and 110. The particular embodiments described herein use the public national information infrastructure (i.e., the Internet) to implement network 101. Alternatively, network element 101 may be implemented as a private network using WAN technology, intranet technology, fibre channel, and the like.

Network components 101, 102 and 110 and network segments 103 and 104 comprise copper, optical, wireless and/or other available physical connection technologies. Network segments 103 and 104 are coupled to network 101 through connect servers 105 and/or firewalls 106 in the example of FIG. 1. Connect servers 105 are implemented by connection sharing software such as Microsoft Internet connection sharing service (ICS) or by software such as found in routers. Firewalls 106 may also be implemented by a router or by other firewall software operating on a special-purpose computer. LANs 103 and 104 may be implemented using any available topology and may implement one or more server technologies including, for example a UNIX, Novell, or Windows NT, or peer-to-peer type network. Each network will include distributed storage implemented in each device and typically includes some mass storage device (not shown) coupled to or managed by a server computer.

Appliances 117 provide application services and network connectivity to users. Network appliances 117 include, for example, computers, printers, file servers, mass storage and the like. Appliances 117 include computing devices varying in complexity from workstations and personal computers to hand-held computers and personal digital assistants to office equipment including telephones, copiers, fax machines and the like. One or more of appliances 117 may be configured as an application and/or file server. Each local network 103 and 104 may include a number of shared devices (not shown) such as printers, file servers, mass storage and the like. Similarly, appliances 117 may be shared through network 101 to provide application and file services, directory services, printing, storage, and the like.

In addition to shared LAN connections to network 101, appliances 117 may also connect to network 101 using the public switched telephone network 102 by way of dial-up connections. Dial-up connections are supported by a variety of Internet service providers (ISPs) 107. Dial up connections may be support by landline connections or through wireless interfaces to PSTN 102 such as available in digital and analog cellular systems. ISP 107 supports a connection to network 101.

In accordance with the present invention, one or more shared network resources 210 are coupled to network 101. For ease of description, a shared network resource 210 is shown, but, in practice, tens, hundreds, or even thousands of resources 210 are geographically and topologically distributed throughout an application environment 100. Each resource 210 has a unique address with respect to network 101 and so is reachable by network-connected appliances 117. Shared network resource 210 may comprise a web server, email server, file server, chat server, application service provider, search engine, database management system, or other network connected resource configured to provide a particular behavior or set of behaviors in response to received requests.

Each of the appliances and servers shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared mass storage (not shown) that provide mass storage capacity beyond what an individual device can efficiently use and manage. Selected components of the present invention may be stored in or implemented in shared mass storage.

In normal operation, appliances request services from shared network resource 210. A request typically specifies an address or name of the resource 210 and identifies the appliance 117 making the request as well as the data or service that is requested. In response, resource 210 provides data and/or functionality to the requesting appliance 117. For example, a shared resource 210 that is configured as a web server receives requests in the form of hypertext transport protocol (HTTP) packets from Internet 101 and responds with web pages (e.g., HTML formatted documents) specified by the request.

In a DoS attack, one or many appliances 117 issue multiple requests for services to shared resource 210 substantially simultaneously. While a typical shared resource 210 such as a web server is configured to handle multiple requests, every system will eventually become overloaded when too many requests are received in a short period.

Figure 2:
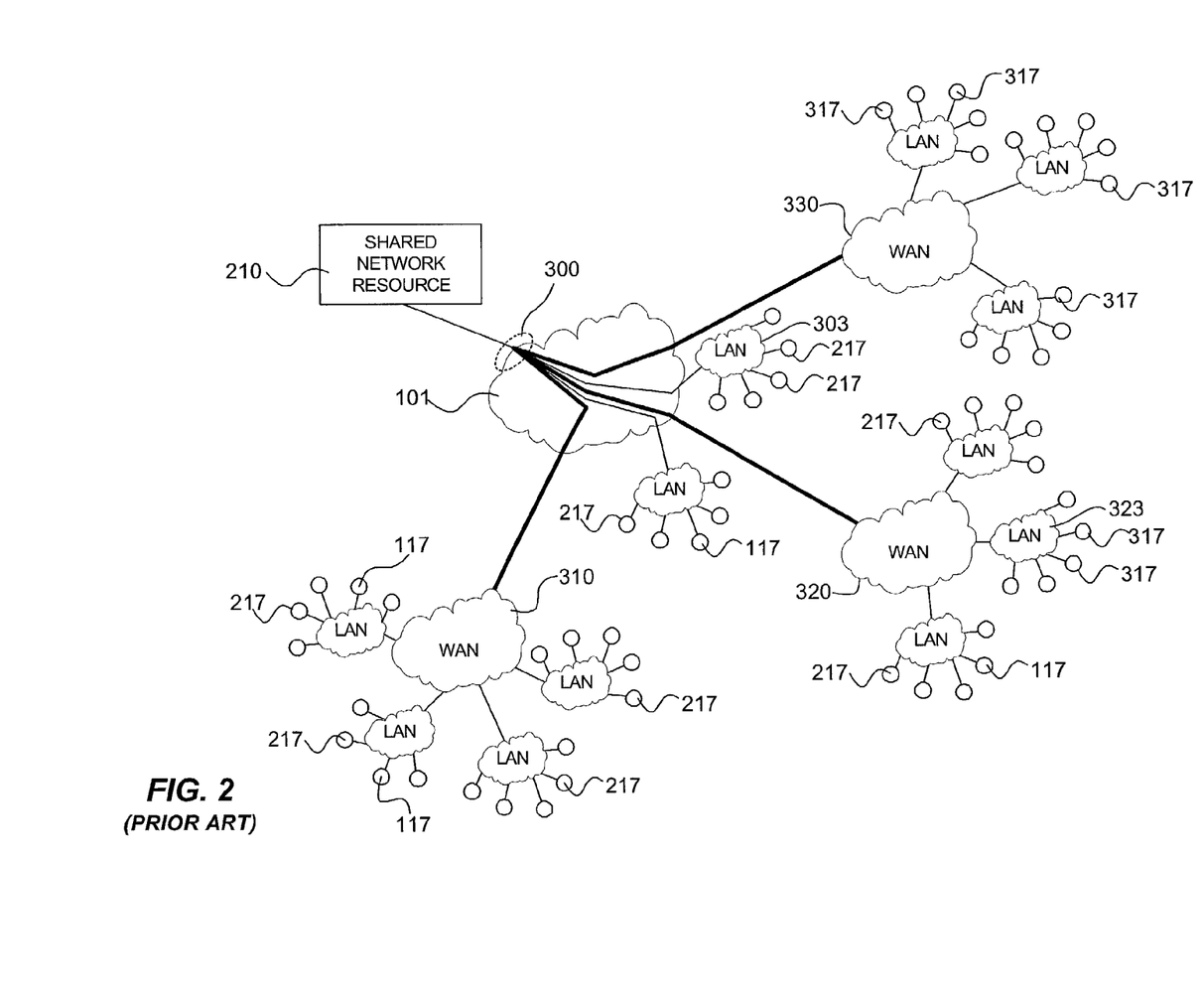
FIG. 2 shows a prior art computer environment.
Figure 3:
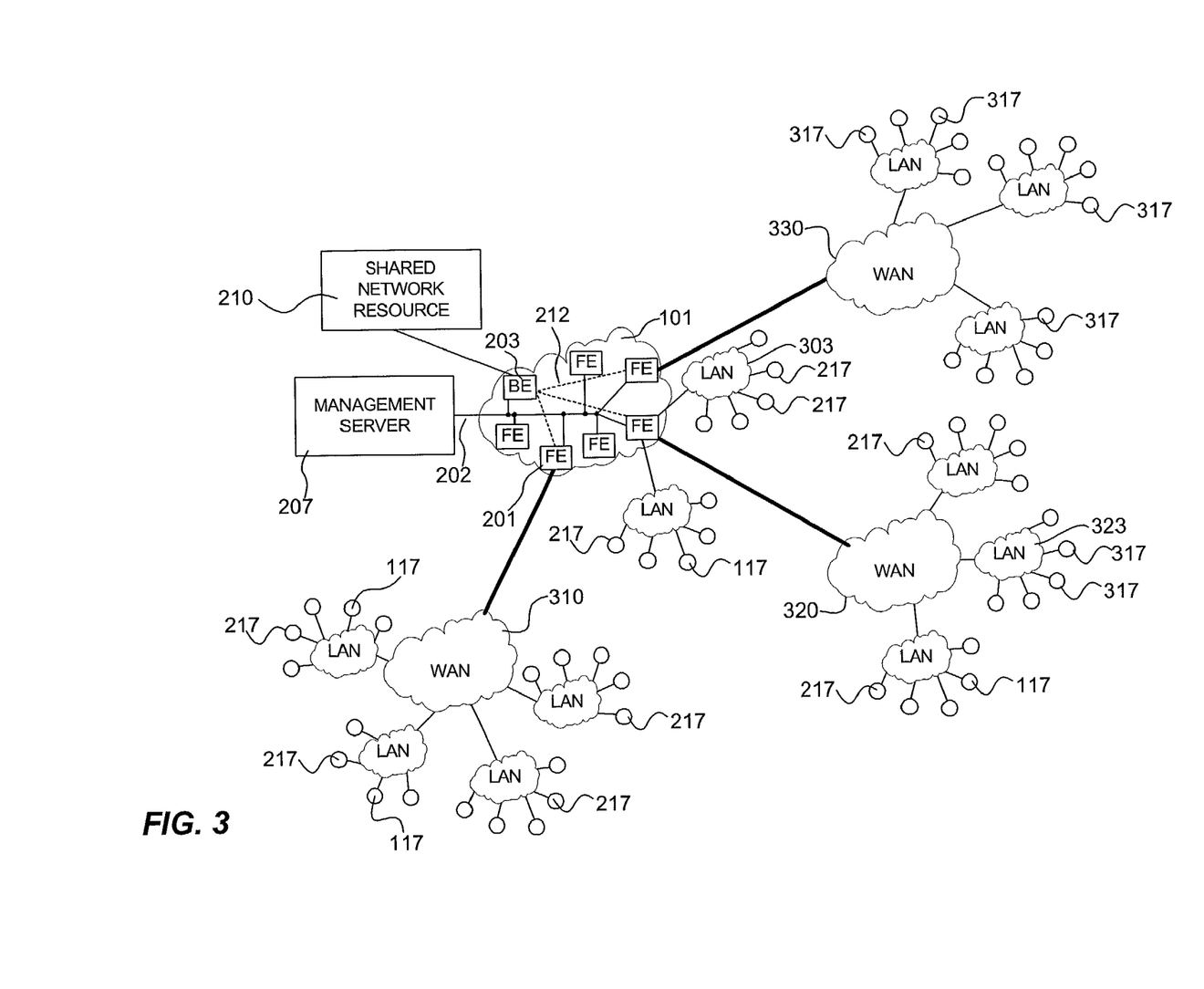
FIG. 3 shows an alternate view of a computer environment in which the present invention is implemented.

FIG. 2 illustrates a prior art environment that is subject to DoS attacks and other performance limitations caused by sudden high traffic volumes. FIG. 3 illustrates an analogous environment in which the present invention is implemented from a network topology perspective. Shared network resource 210 is coupled through Internet 101. A plurality of appliances 117 are coupled through WAN networks 310, 320 and 330. Appliances 117 comprise appliances with general-purpose client software serving solely as connection agents for the particular appliance 117 on which they are executing. For purposes of description, appliances 117 generate "legitimate" requests to shared network resource 210.

A single malicious agent 317 is shown in FIG. 2, although a conspiracy using multiple malicious agents 317 at various locations is handled in a similar manner. Appliances 217 represent appliances having general purpose client software that have been recruited temporarily or permanently to act as distribution agents by the malicious agent 317. Some forms of DoS attacks use weaknesses in the client software that enable otherwise innocent machines to be recruited to launch requests to shared resource 210 thereby magnifying the power of a single malicious agent 317 many fold.

Shared network resource 210 has a single point of contact 300 with Internet 101 which results in a bottleneck during high traffic periods. This bottleneck results from both the bandwidth available at the point of contact as well as the resources (e.g., buffer structures) available within resource 210 itself. Ordinarily, this point of contact 300 is sized to handle an expected traffic load with a safety margin. However, under the high traffic loads that occur during a DoS attack, as suggested by the traffic lines through Internet 101 in FIG. 2, the resources and/or bandwidth are overwhelmed. While a finite amount of resources can be added by implementing shared resource 210 using multiple servers, it is impractical to provide sufficient server resources to handle an extreme load caused by a DoS attack as the added resources remain underutilized during normal operation.

In contrast, the implementation of the invention shown in FIG. 3 includes a plurality of front-end servers 201 (designated "FE" in FIG. 3) that are topologically distributed at the edges of network 101. A back-end server 203 (designated "BE" in FIG. 3) couples to shared resource 210 and serves as the point of contact of resource 210 to network 101. A typical implementation may include hundreds or thousands of front-end servers 201 and a single back-end server 203 associated with shared network resource 210.

Management server 207 couples to each front-end server 201 and back-end server 203 via a management channel 202. Management channel 202 may comprise an broadcast or multicast connection, or in a preferred implementation comprises a user datagram protocol (UDP) connection. Management channel 202 is used to transfer performance metrics and metadata between front-end servers 201, back-end servers 203 and management server 207. Management server 207 also dynamically provides configuration information to front-end servers 201.

The configuration information is used to assign particular front-end servers 201 to particular back-end servers 203 to create communication channels 212. In a particular example, the communications channels 212 are enhanced to provide more efficient transport than conventional TCP connections and may include features such as data compression, prioritization, filtering and the like that enhance performance upon occurrence of a DoS attack.

Management server 207 also includes request redirection mechanisms that redirect requests from various appliances 117, 217 and 317 to selected front-end servers 201. Desirably, any request for services from shared network resource 210 is first be redirected to a front-end 201, pass through channel 212 to back-end 203 before reaching shared resource 210. Although it is important to address DoS attacks as close to the originator as possible, it is important to note that the architecture shown in FIG. 3 can respond to DoS attacks at both front-end servers 201, back-end servers 203 as well as within channel 212.

The logic required for selecting a particular front-end server 201 to serve a particular request may be implemented with several variations. In general, it is desirable that the selection logic be implemented so that neither the users of appliances 117, 217 and 317 nor shared network resource 210 be required to manage the front-end selection process. It is possible that a particular appliance 117, 217 or 317 will use multiple front-end servers 201. It is also contemplated that as traffic loads vary, unused front-end servers 201 may be dynamically assigned to the constellation to increase capacity, while decreasing traffic loads result in dynamic reallocation of front-end servers 201. Reallocation of front-end servers result in freeing up front-end servers 201 to be assigned to other shared resources 210.

One effect of the redirection of requests to front-end servers 201 is that the limited computing and software resources of shared resource 210 are multiplied at least by the number of front-ends that are assigned to that shared resource 210. This multiple may be even greater when front-end servers 201 are implemented to include greater connection resources than shared resource 210. Accordingly, the constellation of front-end servers can withstand a DoS attack that is orders of magnitude greater than could be withstood by the shared resource 210 alone. The requests are funneled over channels 212 to back-end 203 at a rate determined by front-ends 201. Hence, front-ends 201 are able to delay or buffer requests from a particular address range in favor of requests from other address ranges that are given priority.

Back-end 203 receives the multiple requests initially in a rate-governed fashion from front-end servers 201. In turn, back-end 203 provides the requests in a rate-governed fashion to shared network resource 210. Back-end server 203 is able to provide requests at a rate suitable for optimal performance of resource 210. This optimal performance rate may, in fact, be lower than the absolute maximum that could be withstood by resource 210, but ensures that resource 210 continues to operate optimally in event of a DoS attack. Back-end servers 203 are able to prioritize some requests over others, or drop requests from particular addresses once a DoS attack is detected. In this manner, shared network resource 210 is protected from unusually high request rates such as occur in DoS attacks.

Front-end servers 201 and back-end servers 203 may take other responsive action in addition to dropping packets and buffering. In a preferred implementation, either or both of these servers are configured to generate responses on their own. For example, one or more front-end servers 201 may generate a brownout message indicating temporary unavailability of network resources 210 rather than sending the request on to back-end server 203. Such action further minimizes the impact of a DoS attack on Internet 101 and channels 212. The brownout message may be triggered, for example, when internal buffers of a particular front-end server 201 hold more than a predetermined percentage of packets from a particular address domain suggesting a DoS attack from that domain. In a similar manner, front-end servers 201 and back-end servers 203 are able to analyze the traffic, traffic patterns, and other available metrics to detect DoS attacks and take responsive action as quickly as possible.

Management server 207 also participates in responsive action to DoS attacks. In essence, management server 207 has complete knowledge of an entire front-end constellation assigned to a particular shared resource 210. The equivalent knowledge in a conventional Internet infrastructure 101 would comprise knowledge about every router, switch and server in the Internet. The present invention enables this seemingly vast knowledge because each FE-BE channel 212 comprises a large but focused subset of the Internet focused on a particular shared resource 210.

Using this architecture, DoS attacks can be detected early and responsive action taken quickly. For example, individual front-end servers 201 may not receive a sufficient number of requests to detect an abnormal condition. However, management server 207 can be made aware of all requests passing through all front-ends 201 and detect that in aggregate an abnormal condition exists. Management server 207 in some implementations will attempt to validate source addresses that are generating unusually high request rates or other abnormal conditions. Upon detection of a DoS attack, management server 207 is able to alter the configuration information of one or more front-end servers 201 responsively. In this manner, a front-end server 201 can be configured to respond or drop DoS packets rather than forward them even before the front-end server could have detected the condition.

The many front-end requests are funneled into the web server at a rate that will not crash the shared resource 210. Moreover, each front-end can take intelligent soft landing actions when the originating web server is unable to serve the requests in a timely fashion. In one example, the front-end duplicates commonly requested resources from the web site (either dynamically or earlier) and responds using the replicated resources, thereby avoiding a request to the originating server. For example, a front page or index page is usually an easy target for a DoS attack. In any case, the DNS attack will likely focus on a narrow subset of pages. These pages can be replicated in the front-ends based on demand and served from there. Genuine requests can continue to make it through to the originating web server.

Significantly, the number and assignment of front-end servers can be made dynamically and arbitrarily large. This means that the attacker would have to make the number of simultaneous requests arbitrarily large to overwhelm the front-end resources that can be dispatched to handle the increased load. So long as the front-end constellation can adapt quickly enough, it becomes sufficiently difficult to mount a denial of service attack.

Figure 4:
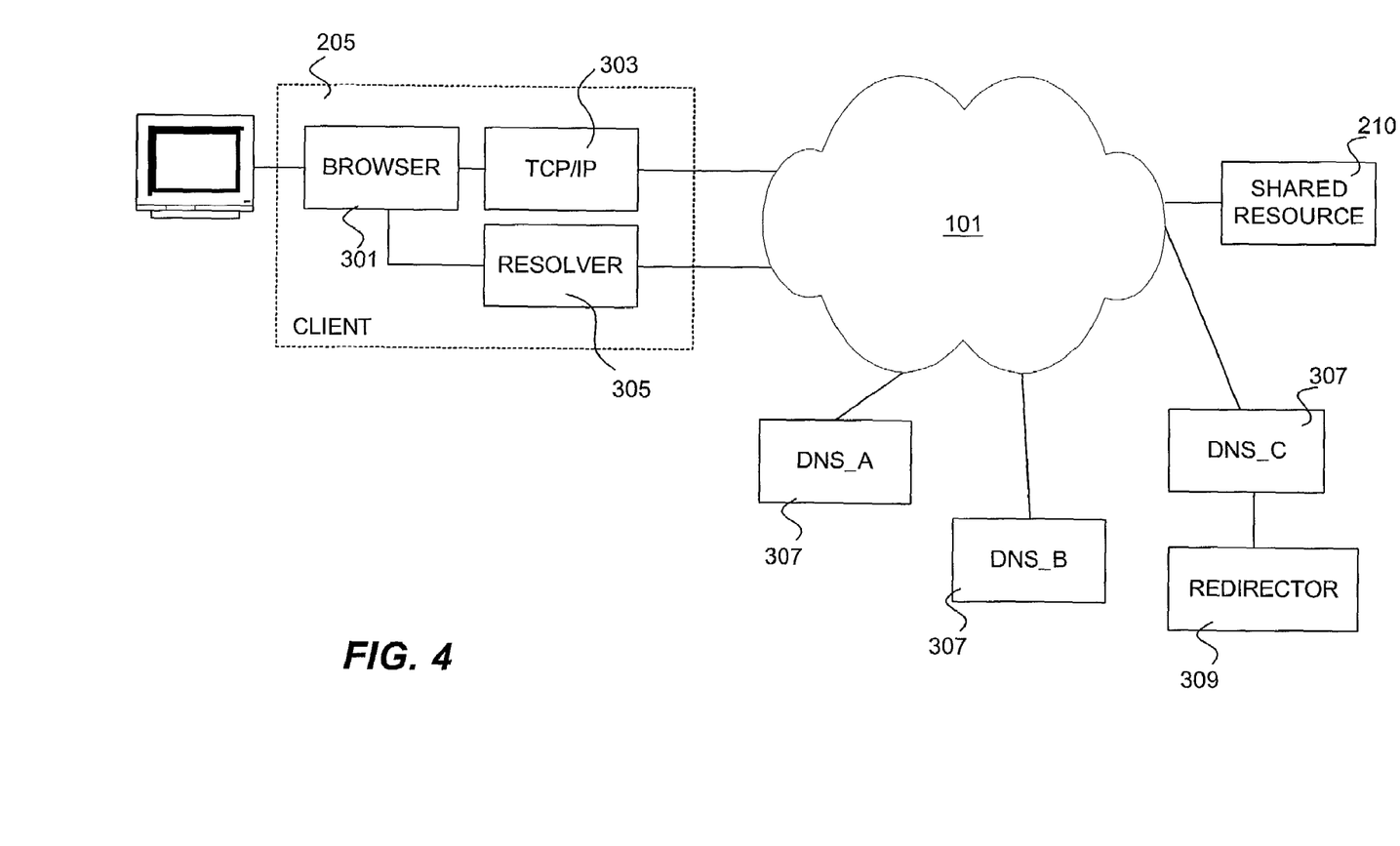
FIG. 4 shows a domain name system used in an implementation of the present invention.
Figure 5:
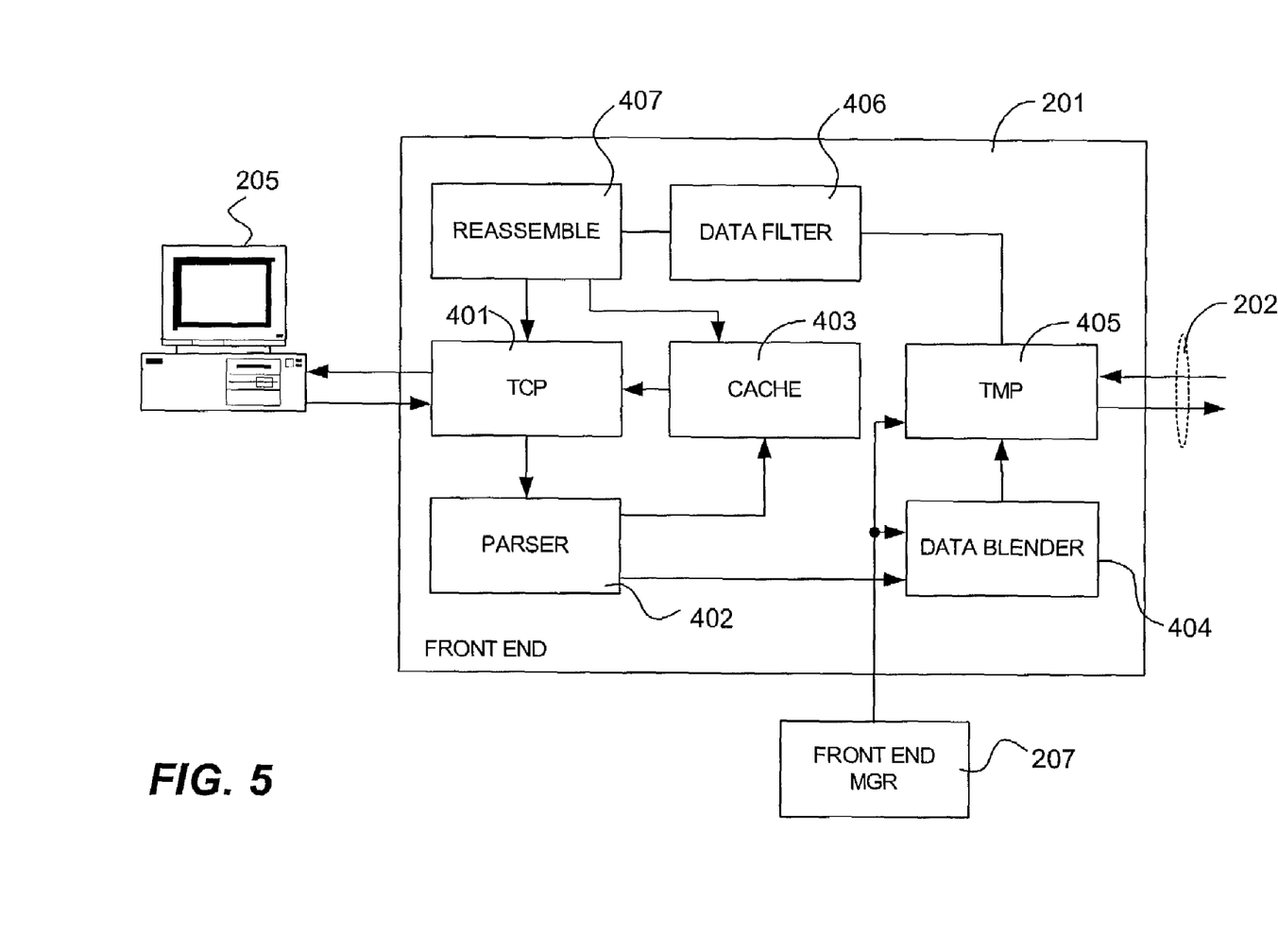
FIG. 5 shows front-end components of FIG. 3 in greater detail.
Figure 6:
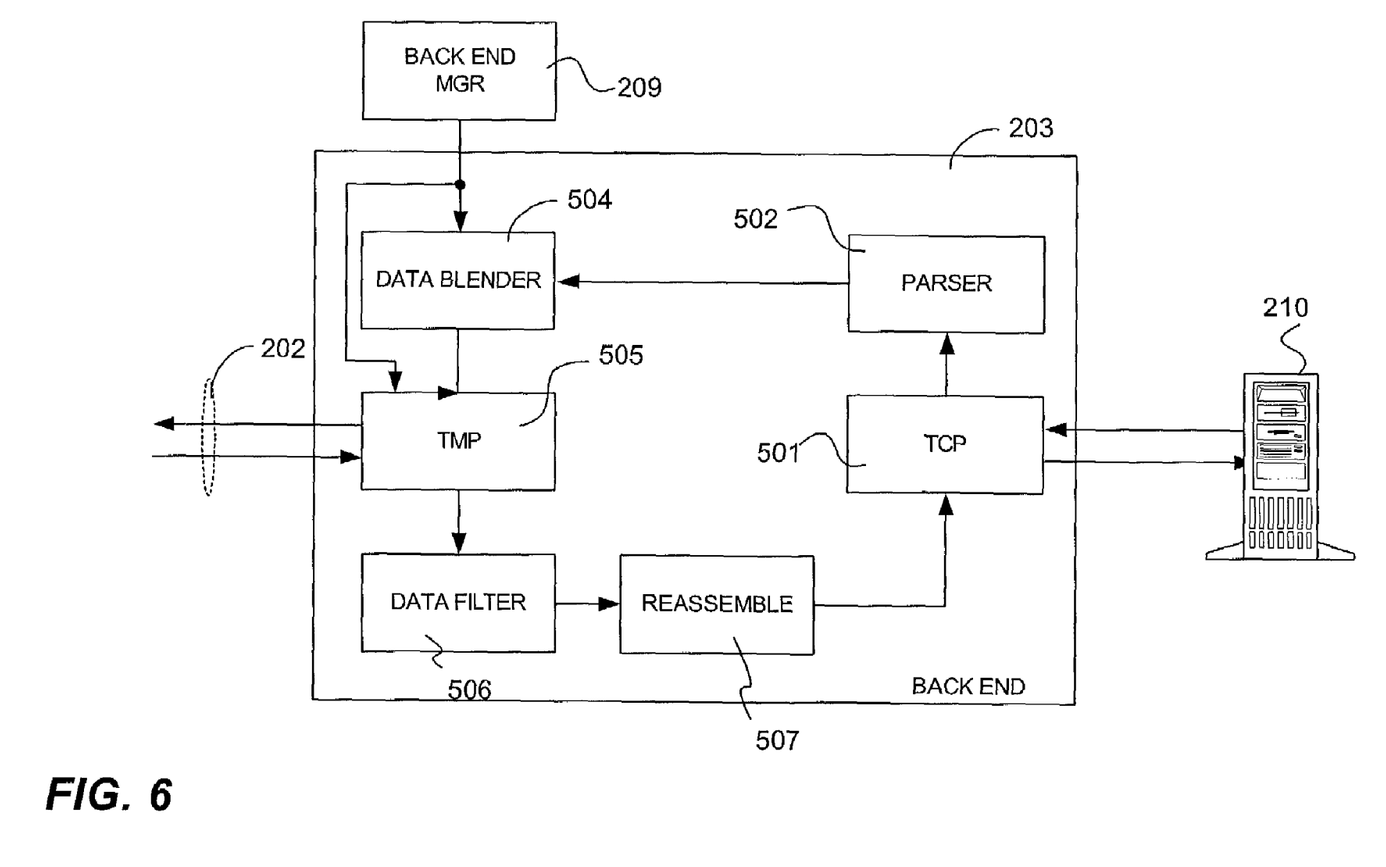
FIG. 6 shows back-end components of FIG. 3 in greater detail.

FIG. 4–FIG. 6 illustrate particular hardware and software elements in an exemplary web-based implementation of the present invention. These specific examples are provided for completeness, and should not be construed as a limitation on the broader teachings of the present invention unless expressly indicated otherwise.

FIG. 4 illustrates a domain name server (DNS) redirection mechanism that illustrates an example of how a client 201 is connected to a particular front-end 201. The DNS systems is defined in a variety of Internet Engineering Task Force (IETF) documents such as RFC0883, RFC 1034 and RFC 1035 which are incorporated by reference herein. In a typical environment, a client 205 executes a browser 301, TCP/IP stack 303, and a resolver 305. For reasons of performance and packaging, browser 301, TCP/IP stack 303 and resolver 305 are often grouped together as processes within a single software product. Browser 301 functions as a graphical user interface to implement user input/output (I/O) through monitor 307 and associated keyboard, mouse, or other user input device (not shown). TCP/IP stack 303 communicates with browser 301 to convert data between formats suitable for browser 301 and IP format suitable for Internet traffic. TCP/IP stack also implements a TCP protocol that manages transmission of packets between client 205 and an Internet service provider (ISP) or equivalent access point.

IP protocol requires that each data packet include, among other things, an IP address identifying a destination node. To provide a more flexible addressing system, the Internet implements a system of domain name servers that map alpha-numeric domain names to specific IP addresses. This system enables a name space that is more consistent reference between nodes on the Internet and avoids the need for users to know network identifiers, addresses, routes and similar information in order to make a connection.

The domain name service is implemented as a distributed database managed by domain name servers (DNSs) 307 such as DNS_A, DNS_B and DNS_C shown in FIG. 3. Each DNS relies on <domain name:IP> address mapping data stored in master files scattered through the hosts that use the domain system. These master files are updated by local system administrators. Master files typically comprise text files that are read by a local name server, and hence become available through the name servers 307 to users of the domain system.

The user programs (e.g., appliances 117) access domain name servers through standard programs such as resolver 305. Resolver 305 includes an address of a DNS 307 that serves as a primary domain name server. When presented with a reference to a domain name (e.g., http://www.vr1.com), resolver 305 sends a request to the primary DNS (e.g., DNS_A in FIG. 3). The primary DNS 307 returns either the IP address mapped to that domain name, a reference to another DNS 307 which has the mapping information (e.g., DNS_B in FIG. 3), or a partial IP address together with a reference to another DNS that has more IP address information. Any number of DNS-to-DNS references may be required to completely determine the IP address mapping.

In this manner the resolver 305 becomes aware of the IP address mapping which is supplied to TCP/IP component 303. Appliance 117 may cache the IP address mapping for future use. TCP/IP component 303 uses the mapping to supply the correct IP address in packets directed to a particular domain name so that reference to the DNS system need only occur once.

In accordance with the present invention, at least one DNS server 307 is owned and controlled by system components of the present invention. When a user accesses a network resource (e.g., a web site), browser 301 contacts the public DNS system to resolve the requested domain name into its related IP address in a conventional manner. In a first embodiment, the public DNS performs a conventional DNS resolution directing the browser to an originating server 210 and server 210 performs a redirection of the browser to the system owned DNS server (i.e., DNC_C in FIG. 3). In a second embodiment, domain:address mappings within the DNS system are modified such that resolution of the of the originating server's domain automatically return the address of the system-owned DNS server (DNS_C). Once a browser is redirected to the system-owned DNS server, it begins a process of further redirecting the browser 301 to the best available front-end 201.

Unlike a conventional DNS server, however, the system-owned DNS_C in FIG. 3 receives domain:address mapping information from a redirector component 309. Redirector 309 is in communication with front-end manager 207 and back-end manager 209 to obtain information on current front-end and back-end assignments to a particular server 210. A conventional DNS is intended to be updated =infrequently by reference to its associated master file. In contrast, the master file associated with DNS_C is dynamically updated by redirector 309 to reflect current assignment of front-end 201 and back-end 203. In operation, a reference to web server 210 (e.g., http://www.circadence.com) may result in an IP address returned from DNS_C that points to any selected front-end 201 that is currently assigned to web site 210. Likewise, web site 210 may identify a currently assigned back-end 203 by direct or indirect reference to DNS_C.

Front-end 201 typically receives information directly from front-end manager 207 about the address of currently assigned back-ends 203. Similarly, back-end 203 is aware of the address of a front-end 201 associated with each data packet. Hence, reference to the domain system is not required to map a front-end 201 to its appropriate back-end 203.

FIG. 5 illustrates principle functional components of an exemplary front-end 201 in greater detail. Primary functions of the front-end 201 include serving as a proxy for web server 210 from the perspective of client 205, and translating transmission control protocol (TCP) packets from client 205 into transport morphing protocols™ (TMP™) packets used in the system in accordance with the present invention. Transport morphing protocol and TMP are trademarks or registered trademarks of Circadence corporation in the United States and other countries. It is contemplated that the various functions described in reference to the specific examples may be implemented using a variety of data structures and programs operating at any location in a distributed network. The present invention is readily adapted to any application where multiple clients are coupling to a centralized resource. Moreover, other transport control protocols may be used, including proprietary transport protocols, so long as the transport protocols supply the functionality of the TCP protocol.

TCP component 401 includes devices for implementing physical connection layer and Internet protocol (IP) layer functionality. Current IP standards are described in IETF documents RFC0791, RFC0950, RFC0919, RFC0922, RFC792, RFC1112 that are incorporated by reference herein. For ease of description and understanding, these mechanisms are not described in great detail herein.

TCP component 401 communicates TCP packets with one or more appliances 117. Received packets are coupled to parser 402 where the Internet protocol (or equivalent) information is extracted. TCP is described in IETF RFC0793 which is incorporated herein by reference. Each TCP packet includes header information that indicates addressing and control variables, and a payload portion that holds the user-level data being transported by the TCP packet. The user-level data in the payload portion typically comprises a user-level network protocol datagram.

Parser 402 analyzes the payload portion of the TCP packet. In the examples herein, HTTP is employed as the user-level protocol because of its widespread use and the advantage that currently available browser software is able to readily use the HTTP protocol. In this case, parser 402 comprises an HTTP parser. More generally, parser 402 can be implemented as any parser-type logic implemented in hardware or software for interpreting the contents of the payload portion. Parser 402 may implement file transfer protocol (FTP), mail protocols such as simple mail transport protocol (SMTP), structured query language (SQL) and the like. Any user-level protocol, including proprietary protocols, may be implemented within the present invention using appropriate modification of parser 402.

To improve performance, front-end 201 optionally includes a caching mechanism 403. Cache 403 may be implemented as a passive cache that stores frequently and/or recently accessed web pages or as an active cache that stores network resources that are anticipated to be accessed. In non-web applications, cache 403 may be used to store any form of data representing database contents, files, program code, and other information. Upon receipt of a TCP packet, HTTP parser 402 determines if the packet is making a request for data within cache 403. If the request can be satisfied from cache 403, the data is supplied directly without reference to web server 210 (i.e., a cache hit). Cache 403 implements any of a range of management functions for maintaining fresh content. For example, cache 403 may invalidate portions of the cached content after an expiration period specified with the cached data or by web sever 210. Also, cache 403 may proactively update the cache contents even before a request is received for particularly important or frequently used data from web server 210. Cache 403 evicts information using any desired algorithm such as least recently used, least frequently used, first in/first out, or random eviction. When the requested data is not within cache 403, a request is processed to web server 210, and the returned data may be stored in cache 403.

Several types of packets will cause parser 402 to forward a request towards web server 210. For example, a request for data that is not within cache 403 (or if optional cache 403 is not implemented) will require a reference to web server 210. Some packets will comprise data that must be supplied to web server 210 (e.g., customer credit information, form data and the like). In these instances, HTTP parser 402 couples to data blender 404.

Optionally, front-end 201 implements security processes, compression processes, encryption processes and the like to condition the received data for improved transport performance and/or provide additional functionality. These processes may be implemented within any of the functional components (e.g., data blender 404) or implemented as separate functional components within front-end 201. Also, parser 402 may implement a prioritization program to identify packets that should be given higher priority service. A prioritization program requires only that parser 402 include a data structure associating particular clients 205 or particular TCP packet types or contents with a prioritization value. Based on the prioritization value, parser 402 may selectively implement such features as caching, encryption, security, compression and the like to improve performance and/or functionality. The prioritization value is provided by the owners of web site 210, for example, and may be dynamically altered, statically set, or updated from time to time to meet the needs of a particular application.

Blender 404 slices and/or coalesces the data portions of the received packets into more desirable "TMP units" that are sized for transport through the TMP mechanism 202. The data portion of TCP packets may range in size depending on client 205 and any intervening links coupling client 205 to TCP component 401. Moreover, where compression is applied, the compressed data will vary in size depending on the compressibility of the data. Data blender 404 receives information from front-end manager 207 that enables selection of a preferable TMP packet size. Alternatively, a fixed TMP packet size can be set that yields desirable performance across TMP mechanism 202. Data blender 404 also marks the TMP units so that they can be re-assembled at the receiving end.

Data blender 404 also serves as a buffer for storing packets from all clients 205 that are associated with front-end 201. Blender 404 mixes data packets coming into front-end 201 into a cohesive stream of TMP packets sent to back-end 203 over TMP link 202. In creating a TMP packet, blender 404 is able to pick and choose amongst the available data packets so as to prioritize some data packets over others.

TMP mechanism 405 implements the TMP protocol in accordance with the present invention. TMP is a TCP-like protocol adapted to improve performance for multiple connections operating over a single channel. Front-end TMP mechanism 405 in cooperation with a corresponding back-end TMP mechanism 505 shown in FIG. 5 are computer programs that implement the end points of TMP pipe 202. The TMP mechanism in accordance with the present invention creates and maintains a stable connection between two processes for high-speed, reliable, adaptable communication.

Also shown in FIG. 4 are data filter component 406 and HTTP reassemble component 407 that process incoming (with respect to client 205) data. TMP mechanism 405 receives TMP packets from TMP pipe 202 and extracts the TMP data units. Using the appended sequencing information, the extracted data units are reassembled into HTTP data packet information by HTTP reassembler 407. Data filter component 406 may also implement data decompression where appropriate, decryption, and handle caching when the returning data is of a cacheable type.

FIG. 6 illustrates principle functional components of an exemplary back-end 203 in greater detail. Primary functions of the back-end 203 include translating transmission control protocol (TCP) packets from web server 210 into TMP packets as well as translating TMP packets received from a front-end 201 into the one or more corresponding TCP packets to be send to server 210.

TMP unit 505 receives TMP packets from TMP pipe 202 and passes them to HTTP reassemble unit 507 where they are reassembled into the corresponding TCP packets. Data filter 506 may implement other functionality such as decompression, decryption, and the like to meet the needs of a particular application. The reassembled data is forwarded to TCP component 501 for communication with web server 210.

TCP data generated by the web server process are transmitted to TCP component 501 and forwarded to HTTP parse mechanism 502. Parser 502 operates in a manner analogous to parser 402 shown in FIG. 4 to extract the data portion from the received TCP packets, perform optional compression, encryption and the like, and forward those packets to data blender 504. Data blender 504 operates in a manner akin to data blender 404 shown in FIG. 4 to buffer and prioritize packets in a manner that is efficient for TMP transfer. Priority information is received by, for example, back-end manager 209 based upon criteria established by the web site owner. TMP data is streamed into TMP unit 505 for communication on TMP pipe 202.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A security service for a shared network server comprising:
   providing a network and a shared network server coupled to the network, the shared network server having a fixed quantity of resources for responding to network requests;
   providing a constellation of front-end servers within the network;
   using the front-end servers to receive requests destined for the shared network server;
   forwarding the received requests from the front-end servers to the shared network server at a governed rate;
   coupling a management server to each of the front-end servers;
   communicating metrics between the front-end servers and the management server;
   using the metrics to detect a denial of service attack targeted at the shared network server;
   using the metrics to determine configuration parameters for the front-end servers; and
   communicating the configuration parameters from the management server to the front-end servers.

2. The service of claim 1 wherein the governed rate is selected to present requests at a rate that will prevent overwhelming the fixed quantity of resources within the shared network server.

3. The service of claim 1 further comprising dynamically altering the number of front-end servers in the constellation.

4. The service of claim 1 further comprising detecting a denial of service attack targeted at the shared network server; and
   preventing the act of forwarding the received requests in response to detecting the DoS attack.

5. A system for handling denial of service attacks on behalf of a shared network resource, the system comprising:
   a request processing component deployed within a network, the request processing component having an interface configured to receive requests on behalf of the shared network server;
   a rate control component coupled to the request processing component, the rate control component comprising program and data structures operable to selectively forward received requests to the shared network server at a rate selected to prevent the shared network server from crashing or becoming undesirably busy; and
   a DoS attack detection component coupled to the request processing component and the rate control component and operable to monitor request metrics from the request processing component and provide configuration information to the rate control component, wherein the rate control component comprises mechanisms for preferentially forwarding requests not related to the DoS attack in favor of request related to the DoS attack to the shared network resource.

6. The system of claim 5 further comprising:
   a plurality of front-end servers deployed throughout a network, wherein the front-end servers are configured to implement the request processing component and the rate control component;
   a management server coupled to each of the front-end servers, the management server including mechanisms to send configuration information to the front-end servers, and receive request processing metrics from the request processing component.

7. The system of claim 5 wherein the request processing component is configured to handle a greater volume of requests than the shared network resource.

8. The system of claim 5 further comprising mechanisms within the front-end servers operable to detect a denial of service attack.

9. A system for handling denial of service attacks on behalf of a shared network resource, the system comprising:
   a request processing component deployed within a network, the request processing component having an interface configured to receive requests on behalf of the shared network server;
   a rate control component coupled to the request processing component, the rate control component comprising program and data structures operable to selectively forward received requests to the shared network server at a rate selected to prevent the shared network server from crashing or becoming undesirably busy;
   a plurality of front-end servers deployed throughout a network, wherein the front-end servers are configured to implement the request processing component and the rate control component;
   a management server coupled to each of the front-end servers, the management server including mechanisms to send configuration information to the front-end servers, and receive request processing metrics from the request processing component:
   a back-end server coupled to receive the forwarded requests from the front-end servers; and
   a rate governor within the back-end server for selectively forwarding received requests to the shared network resource at a rate selected to prevent the shared network resource from crashing becoming undesirably busy.

10. A method for mitigating a denial of service attack comprising the acts of:
    providing a shared network resource coupled to a public network and receiving requests from the public network;
    providing a plurality of front-end servers, each having a unique network address and coupled to the shared network resource;
    assigning a plurality of front-end servers to the shared network resource, wherein the aggregate request processing capacity of the assigned front-end servers is greater than the request handling capacity of the shared network resource;
    causing requests for the shared network resource to be redirected through one of the front-end servers; and
    forwarding the requests from the front-end server to the shared network resource at a rate selected to inhibit a likelihood of a crash or an undesirable level of business;
    detecting a condition in which the number of requests is greater than the request capacity of the shared network resource; and
    generating a response to the requests from the front-end servers instead of forwarding the requests to the shared network resource,
    wherein the act of detecting comprises distinguishing requests associated with a DoS attach from legitimate requests and the step of generating a response comprises generating a response only to requests associated with the DoS attack while forwarding legitimate requests to the shared network resource.

11. The method of claim 10 further comprising:

in event of a denial of service attack comprising a plurality of malicious requests involving the shared network resource, causing at least some of the malicious requests to be delayed in the front-end servers before reaching the shared network resource.

12. The method of claim 11 further comprising:

in event of a denial of service attack comprising a plurality of malicious requests involving the shared network resource, causing at least some of the malicious requests to be ignored in the front-end servers before reaching the shared network resource.

13. The method of claim 10 further comprising:

in event of a denial of service attack comprising a plurality of malicious requests involving the shared network resource, causing at least some of the malicious requests to be ignored by the front-end servers.

14. The method of claim 10 further comprising:

sending request processing metrics from each of the front-end servers to a centralized management server; and using the centralized management server to analyze the request processing metrics to detect a denial of service attack.

15. The method of claim 10 further comprising:

sending configuration information from the centralized management server to some or all of the front-end servers in response to detecting a DoS attack, the configuration information including an identification of address domains associated with the DoS attack; and using the configuration information in the front-end server to selectively drop requests from the address domain identified in the configuration information.

* * * * *